United States Patent
Peters et al.

[15] 3,705,178
[45] Dec. 5, 1972

[54] 1,5-BIS-(2-NITRO-ANILINO)-ANTHRAQUINONE

[72] Inventors: Karl-Heinz Peters, Koeln-Buchheim; Rutger Neeff, Leverkusen, both of Germany

[73] Assignee: Farbenfabriken Bayer Aktiengesellschaft, 3, Leverkusen, Germany

[22] Filed: Dec. 30, 1969

[21] Appl. No.: 1,912

Related U.S. Application Data

[62] Division of Ser. No. 663,987, Aug. 29, 1967, abandoned.

[52] U.S. Cl. ............................260/378, 8/62, 8/63, 106/20, 106/288 Q

[51] Int. Cl. .......................C09b 1/32, C07c 87/64
[58] Field of Search..........................260/378

[56] References Cited

OTHER PUBLICATIONS

Hayashi et al., Bull. Chem. Soc. Japan 38 916 (1965)
Hayashi et al. Bull. Chem. Soc. Japan 35 1500 (1962)

*Primary Examiner*—Lorraine A. Weinberger
*Assistant Examiner*—Robert Gerstl
*Attorney*—Plumley & Tyner

[57] ABSTRACT

A pigment, 1,5-bis-(2-nitroanilino)- anthraquinone has been prepared.

1 Claim, No Drawings

1,5-BIS-(2-NITRO-ANILINO)-ANTHRAQUINONE

This application is a division of copending application Serial No. 663,987, filed Aug. 29, 1967, to be abandoned.

A pigment, 1,5-bis-(2-nitroanilino)-anthraquinone has been prepared. This invention relates to the novel compound 1,5-bis-(2-nitroanilino)-anthraquinone and compositions containing this compound as a pigment.

The compound of this invention is useful in a wide variety of pigmenting applications. Broadly stated, the anthraquinone derivative of this invention is a pigment that may be used to color any dispersion phase in which the pigment can exist as a dispersed phase. The dispersion phase may be solid, semi-solid, or liquid. The pigment is preferably dispersed therein in finely divided form.

Polymeric materials are particularly suited for the dispersion phase material. The term "polymeric materials" encompasses both natural and synthetic polymers. The synthetic polymers may be addition or condensation products, as will be hereinafter specifically disclosed.

As examples of polymeric materials forming a solid dispersion phase, there may be mentioned cellulose, natural fibers, natural polymers, synthetic polymers, and plastic masses of all kinds. Specifically, the compound of this invention may be used as a pigment for paper (cellulose fibers), and for coloring polymeric materials which are naturally occurring, such as rubber and caoutchouc; those polymers obtained by chemical modification of natural materials such as acetyl cellulose, cellulose butyrate and viscose; and for polymeric materials which are synthetically produced such as plastic masses such as polyvinyl chloride, polyvinyl acetate, polyvinyl propionate, polyolefines, for example polyethylene or polypropylene, polyesters, for example, polyethylene terephthalate, polyamides, super polyamides, polymers and copolymers of acrylic esters, methacrylic esters, acrylonitrile, acrylamide, butadiene, styrene, as well as polyurethanes and polycarbonates. The polymeric materials may be cross-linked, hardened, vulcanized, or otherwise modified when desired Among the liquid dispersion phase material which may be mentioned are water, organic liquids such as those commonly used as organic solvents, drying oils, and the like. These liquids may or may not have polymeric or other binder materials dissolved therein and may be solutions, dispersions, or emulsions. Examples of liquid dispersion phase materials having the pigment of this invention dispersed therein are flush pastes with organic liquids or pastes or fine pastes with water, dispersing agents and, optionally, preservatives.

Other examples include coating agents such as physically or oxidatively drying lacquers, stoving lacquers, two-component lacquers, disperse dyestuffs for weather-proof coatings, and size colors.

Examples of the semi-solid dispersing agents containing the pigment of this invention are printing colors and inks for paper, textiles and the like.

The pigment of this invention may be blended with other pigments such as titanium dioxide or may be incorporated into inorganic, settable compositions such as cement.

Proportions of the pigment are dictated by the end use, and, in general, will be substantially similar to proportions employed in normal pigmenting operations.

The compositions colored with the pigment of this invention may appear in any form which the dispersing phase without the pigment may appear in. Thus, it is contemplated that the pigmented compositions of matter may become coatings or printings for a variety of materials such as metals, fabrics, paper, and the like. The pigmented compositions may be formed into molded articles, cast, or extruded into films or foils, extruded into fibers or filaments, or the like.

The 1,5-bis-(2-nitro-anilino)-anthraquinone has excellent pigment properties and it is not only eminently fast to water, oil, acid, lime, alkali, solvents, top coating, spray-coating, sublimation, heat and vulcanization, but it also gives very good yields, is readily dispersible in plastic masses and has outstanding fastness to light and weather.

The 1,5-bis-(2-nitro-anilino)-anthraquinone can be prepared, for example, by condensing 1,5-diamino-anthraquinone with excess 2-chloro-nitrobenzene in the present of an acid-binding agent, such as sodium acetate, potassium acetate, potash or sodium carbonate, with the addition of metallic copper and/or a copper salt, at temperatures between 180°C and 240°C in a high-boiling solvent such as di -or trichlorobenzene, nitrobenzene or 2-chloronitrobenzene; or by reacting 1,5-dichloro-anthraquinone in an analogous manner with 2-nitro-aniline.

For conversion into a form suitable for pigments, the product, which is obtained in the form of large red prisms, can be brought into a finely divided state by a known after-treatment, for example, by dissolving or swelling in a strong inorganic acid such as sulphuric acid, and pouring on to ice. The fine division can also be achieved by grinding with or without grinding auxiliaries, such as inorganic acids or sand, optionally in the presence of a solvent, such as toluene, xylene, dichlorobenzene or N-methylpyrrolidone. The depth of color and the transparency of the pigment can be influenced by varying the after-treatment.

In German pat. specification No. 175,069 there is described the production of 1-(4-nitro-anilino)-anthraquinone and 1,4-bis-(4-nitro-anilino)-anthraquinone, and the use of these compounds as starting materials for dyestuffs is mentioned. Our own experiments have shown that these compounds, when used as pigment dyes, have a substantially poorer fastness to solvents, top-coating, spray-coating, light and weather than 1,5-bis-(2-nitro-anilino)-anthraquinone.

In the following Examples, illustrative of only a few of the possible applications of the new compound as a pigment, the parts given are parts by weight:

EXAMPLE 1 a. Eight Parts 1,5-bis-(2-nitro-anilino)-anthraquinone which have been brought into a finely divided state by grinding in a vibrator mill with 2 parts xylene and 160 parts sodium chloride and washing out the sodium chloride component, are ground in an automatic Hoover-Muller grinding machine with a stoving lacquer consisting of 25 parts coconut oil-alkyd resin (40 percent coconut oil), 10 parts melamine resin, 50 parts toluene and 7 parts glycol monomethyl ether. The mixture is applied to the substrate to be lacquered, the lacquer is hardened by stoving at 130°C, and there are obtained red lacquerings of good covering power, very good fastness to top coating and excellent fastness to light and weather.

Pigmented stoving lacquers with the same fastness properties are obtained by using 15 – 25 parts of the stated alkyd resin or of an alkyd resin based on cotton seed oil, dehydrated castor oil, castor oil or synthetic fatty acids, and replacing the stated amount of melamine resin by 10 – 15 parts of the melamine resin or of a condensation product of formaldehyde with urea or benzoguanamine.

b. If instead of using 8 parts of the new pigment there is used 1 to 10 parts of a mixture of titanium dioxide (rutile type) with the new pigment in the ratio 0.5 – 50 : 1, and the mixture is ground with the lacquer indicated in Example 1a, then the same method of working up yields lacquerings which have the same fastness properties, and a red shade which shifts to white as the content of titanium dioxide increases.

c. The new pigment compound is prepared, for example, by heating 144 parts 1,5-diamino-anthraquinone in 800 parts 2-chloro-1-nitrobenzene in the present of 120 parts of potash, 1 part copper acetate and 0.5 parts of copper grindings at 190° to 210°C until the reaction is complete, filtering off the product with suction at 65° to 100°C, washing with nitrobenzene, dichlorobenzene, trichlorobenzene, chlorobenzene or 2-nitrobenzene, then with methanol and hot water, and drying. Red prisms are obtained.

$C_{26}H_{16}N_4O_6$ (molecular weight 480)
Calculated O 20.0%  Found O 20.03; 20.11% d. (For comparison) If instead of the indicated 1,5-bis-(2-nitro-anilino)-anthraquinone, there are used in Example 1a 8 parts of the dyestuff described in German patent specification No. 175,069, Example 4 of Table, then there are obtained dark-violet lacquerings of substantially poorer fastness properties, for example, a very poor fastness to top coating. If 8 parts of the dyestuff prepared according to German patent specification No. 175,069, Example 1, are used, then there are obtained red lacquerings of poor fastness properties, for example, completely unsatisfactory fastness to top coating and migration.

EXAMPLE 2

Six Parts 1,5-bis-(2-nitro-anilino)-anthraquinone are ground with 100 parts of a nitrocellulose lacquer consisting of 44 parts collodion wool (low viscosity, 35 percent, butanol-moist), 5 parts dibutyl phthalate, 40 parts ethyl acetate, 20 parts toluene, 4 parts n-butanol and 10 parts glycol monomethyl ether. After spreading and drying, there are obtained red lacquerings of excellent fastness to light and top coating.

The same results are achieved with the use of nitro lacquers containing 10 – 15 parts nitrocellulose, 5–10 parts of plasticizer and 70 – 85 parts of a solvent mixture, preferably with the use of an aliphatic ester such as ethyl acetate or butyl acetate and an aromatic hydrocarbon such as toluene or xylene, and smaller proportions of aliphatic ether such as glycol ether, and an alcohol such as butanol. The plasticizer may be, for example, a phthalic acid ester such as dioctyl phthalate or dibutyl phthalate, an ester of phosphoric acid, or castor oil by itself or in combination with an oil-modified alkyd resin.

Lacquerings of similar fastness properties are obtained by using other physically drying spirit-, zapon- and nitro- lacquers, air-drying oil-, synthetic resin- and nitro-combination lacquers, oven- and air-drying epoxide resin lacquers, optionally in combination with a urea, melamine, alkyd or phenol resin.

EXAMPLE 3

Five Parts 1,5-bis-(2-nitro-anilino)-anthraquinone are ground in a porcelain ball mill with 100 parts of a paraffin-free drying unsaturated polyester resin. Ten parts monostyrene, 5 parts melamine-formaldehyde resin and 1 part of a paste consisting of 40 parts cyclohexanone peroxide and 60 parts dibutyl phthalate are well stirred with the mixture and, finally, 4 parts of a drier solution (10 percent cobalt naphthenate in test benzine) and 1 part of a silicone oil solution (1 percent in xylene) are admixed. The mixture is applied to primed wood, and there is obtained a red lacquering of high gloss, which is resistant to water and weather and eminently fast to light.

If the reaction lacquer based on unsaturated polyester resin is replaced with an amine-hardening epoxide resin lacquer containing dipropylene triamine as the amine component, then red lacquerings of excellent fastness to weather and blooming are obtained. The good fastness of the pigment to acid also permits the use of acid-hardening lacquers which are hardened with 10 percent alcoholic hydrochloric acid.

EXAMPLE 4

One hundred parts of a 65 percent of an aliphatic polyester containing about 8 percent of free hydroxyl groups in glycol monethyl acetate are ground with 5 parts 1,5-bis-(2-nitro-anilino)-anthraquinone and then well mixed with 44 parts of a 67 percent solution of the reaction product of 1 mole trimethylol-propane with 3 moles toluylene diisocyanate. Without adverse effect on the pot life, there are obtained, after application of the mixture and reaction of the components, polyurethane lacquerings of high gloss and outstanding fastness to blooming, light and weather.

Pigmentations of similar fastness properties are obtained when using other two-component lacquers based on aromatic or aliphatic isocyanates and polyethers or polyesters containing hydroxyl groups, as well as with moisture-drying polyisocyanate lacquers yielding polyurea lacquerings.

EXAMPLE 5

Five parts of a fine paste obtained by kneading 50 parts 1,5-bis-(2-nitro-anilino)-anthraquinone with 15 parts of an aryl polyglycol ether emulsifier and 35 parts of water, are mixed with 10 parts barite as filler, 10 parts titanium dioxide (rutile type) as white pigment and 40 parts of an aqueous disperse dye containing about 50 percent polyvinyl acetate. The dye is spread and after drying, there are obtained red coatings of very good fastness to lime and cement and excellent fastness to weather and light.

The fine paste obtained by kneading is equally suitable for the pigmentation of clear polyvinyl acetate disperse dyes, for disperse dyes containing copolymers of styrene and maleic acid as binders, as well as disperse dyes based on polyvinyl propionate, polymethacrylate or butadiene-styrene.

EXAMPLE 6

Ten parts of the pigment paste mentioned in Example 5 are mixed with a mixture of 5 parts of chalk and 5 parts of a 20 percent glue solution. A red wallpaper paint is obtained with which coatings of excellent fastness to light are achieved.

To prepare the pigment paste, there may also be used other non-ionic emulsifiers, such as the reaction products of nonyl phenol with ethylene oxide, or ionic wetting agents, such as the sodium salts of alkylaryl sulphonic acids, for example, of dinaphthyl-methane-disulphonic acid, sodium salts of substituted sulphofatty acid esters and sodium salts of paraffin-sulphonic acids in combination with alkyl polyglycol ethers.

EXAMPLE 7

A mixture of 65 parts polyvinyl chloride, 35 parts diisooctyl phthalate, 2 parts dibutyl tin mercaptide, 0.5 parts titanium dioxide and 0.5 parts of the pigment described in Example 1(c), which has been finely divided by grinding with sodium chloride in the presence of N-methyl-pyrrolidone, is dyed in a mixing roll mill at 165°C. An intensely red-colored mass is obtained, which can serve for the production of foils or shaped articles. The dyeing is characterized by excellent fastness to light and very good fastness to plasticizers.

EXAMPLE 8

0.2 Parts 1,5-bis-(2-nitro-anilino)-anthraquinone are mixed with 100 parts of a polyethylene, polypropylene or polystyrene granulate. The mixture can be either directly injection-moulded in an injection moulding machine or worked up into colored rods in an extruder or into colored rough sheets in a mixing roll mill. If desired, the rods or rough sheets are granulated and injection-moulded in an injection moulding machine.

The red mouldings have very good fastness to light and migration.

In a similar manner, synthetic polyamides of caprolactam or adipic acid and hexamethylene-diamine or the condensation products of terephthalic acid and ethylene glycol can be dyed at 280° – 300°C, and, if desired, in a nitrogen atmosphere.

EXAMPLE 9

1 Part 1,5-bis-(2-nitro-anilino)-anthraquinone, 10 parts titanium dioxide (rutile type) and 100 parts of a copolymer which is based on acrylonitrile-butadiene-styrene and is present in powdered form are mixed and dyed in a roll mill at 140° – 180°C. There is obtained a red rough sheet which is granulated and injection-moulded at 200° – 250°C in an injection moulding machine. Red mouldings of very good fastness to light and migration and of excellent thermal stability are obtained.

Synthetic materials based on cellulose acetate, cellulose butyrate or mixtures thereof can be dyed in a similar manner, but at temperatures of 180° – 220°C and without the addition of titanium dioxide, similar fastness properties being achieved.

EXAMPLE 10

0.2 Parts 1,5-bis-(2-nitro-anilino)-anthraquinone in finely divided form are mixed with 100 parts of a synthetic material based on polycarbonate in an extruder or in a kneading worm at 250° – 280°C and worked up into a granulate. A red transparent granulate of excellent fastness to light and thermal stability is obtained.

EXAMPLE 11

Ninety Parts of a slightly branched polypropylene glycol having a molecular weight of 2,500 and a hydroxyl number of 56, 0.25 parts endoethylene-piperazine, 0.3 parts tin (II) octoate, 1.0 part of a polyether siloxane, 3.5 parts of water, 12.0 parts of a dilution of 10 parts 1,5-bis-(2-nitro-anilino)-anthraquinone in 50 parts of the above polypropylene glycol are well mixed with one another and subsequently intimately mixed with 45 parts toluylene diisocyanate (80 percent 2,4- and 20 percent 2,6-isomer) and poured into a mould. The mixture becomes turbid after 6 seconds and the foam formation takes place. After 70 seconds, an intensely red-colored soft polyurethane foam has formed the pigmentation of which exhibits outstanding fastness to light.

EXAMPLE 12

90 Parts of a slightly branched polyester of adipic acid, diethylene glycol and trimethylol-propane having a molecular weight of 2,000 and a hydroxyl number of 60 are mixed with the following components: 1.2 parts dimethyl benzylamine, 2.5 parts sodium castor oil-sulphate, 2.0 parts of an ethoxylated benzylated hydroxy-diphenyl, 1.75 parts of water, 12 parts of a paste prepared by grinding 10 parts 1,5-bis-(2-nitroanilino)-anthraquinone in 50 parts of the above polyester. After mixing, 40 parts toluylene diisocyanate (65 percent 2,4- and 35 percent 2,6-isomer) are added with stirring and the mixture is poured into a mould and foamed. After 60 seconds, a red-colored soft polyurethane foam has formed, the coloration of which is characterized by very good fastness to light.

EXAMPLE 13

A printing paste prepared by grinding 35 parts 1,5-bis-(2-nitro-anilino)-anthraquinone and 65 parts linseed oil with the addition of 1 part of a siccative (Co-naphthenate, 50% in test benzine) yields red offset prints of high brilliancy and color depth and of very good fastness to light and lacquering.

The use of this printing color in typography, heliography, lithography or steel engraving leads to red prints of similar fastness properties. When the pigment is used for the coloring of printing colors for tin printing or low viscosity intaglio printing or of printing inks, then red prints of similar fastness properties are obtained.

EXAMPLE 14

A printing paste is prepared from 10 parts of the pigment fine paste described in Example 5, 100 parts tragacanth, 100 parts of an aqueous 50 percent egg albumin solution and 25 parts of a non-ionic wetting agent. A textile fiber fabric is printed, steamed at 100°C and there is obtained a red print which is characterized by excellent fastness properties, particularly fastness to light. In the printing mixture the tragacanth and egg albumin may be replaced by other binding agents suitable for the fixation on the fiber, for example, those based on synthetic resin, British gum or cellulose glycolate.

EXAMPLE 15

A mixture of 100 parts of light crepe, 2.6 parts sulphur, 1 part stearic acid, 1 part mercaptobenzothiazole, 0.2 parts hexamethylene-tetramine, 5 parts zinc oxide, 60 parts chalk and 2 parts titanium dioxide (anatase type) is colored in a roll mill at 50°C with 2 parts 1,5-bis-(2-nitro-anilino)-anthraquinone and then vulcanized at 140°C for 12 minutes. A red-colored vulcanisate of very good fastness to light is obtained.

EXAMPLE 16

To 100 parts of a 20% aqueous paste of 1,5-bis-(2-nitro-anilino)-anthraquinone, prepared by dissolving the pigment in 96 percent sulphuric acid, pouring on to ice, filtering and washing with water until ne al, 22,500 parts of an aqueous, approximately 9 percent viscose solution are added in a mixer. The colored mass is stirred for 15 minutes, subsequently deaerated and subjected to a spinning and desulphurization process. Red-colored filaments or rolls of very good fastness to light are obtained.

Pigmented filaments or foils with similar fastness properties are obtained, when a 20 percent solution of acetyl cellulose in acetone or a 15 – 25 percent solution of polyacrylonitrile in dimethyl formamide is colored with the finely divided pigment described in Example 1c and subjected to a dry spinning process.

EXAMPLE 17

10,000 parts of paper pulp containing 4 parts cellulose per 100 parts are treated in a hollander for about 2 hours. During this time there are added, at intervals of 15 minutes, 4 parts of resin glue, then 30 parts of an approximately 15 percent pigment dispersion obtained by grinding 4.8 parts 1,5-bis-(2-nitro-anilino)-anthraquinone with 4.8 parts dinaphthyl-methane-disulphonic acid and 22 parts of water in a ball mill, and then 5 parts aluminum sulphate. After finishing in the paper machine, there is obtained a red-colored paper of excellent fastness to light.

EXAMPLE 18

The red-pigmented paper produced according to Example 17 is impregnated with a 55 percent solution of an urea-formaldehyde resin in n-butanol and stoved at 140°C. A red laminated paper of very good fastness to migration and outstanding fastness to light is obtained.

A laminated paper with the same fastness properties is obtained by laminating a paper which was printed by the intaglio process with a printing color containing the pigment fine paste indicated in Example 5 and water-soluble or hydrolyzable binding agents.

We claim: -nitro-anilino)-anthraquinone.

1. 1,5-bis-(2-nitro-anilino)-anthraquinone.

* * * * *